(12) United States Patent
Meijer et al.

(10) Patent No.: US 8,091,070 B2
(45) Date of Patent: Jan. 3, 2012

(54) DEEP EMBEDDING OF PROGRAM LANGUAGES

(75) Inventors: Henricus Johannes Maria Meijer, Mercer Island, WA (US); Bruno S. Bozza, Redmond, WA (US); Brian C. Beckman, Newcastle, WA (US)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 11/621,018

(22) Filed: Jan. 8, 2007

(65) Prior Publication Data
US 2008/0168421 A1 Jul. 10, 2008

(51) Int. Cl.
*G06F 9/44* (2006.01)
(52) U.S. Cl. .................................. 717/117; 717/116
(58) Field of Classification Search ........... 717/114–119
See application file for complete search history.

(56) References Cited

U.S. PATENT DOCUMENTS

| | | | |
|---|---|---|---|
| 5,535,391 A | 7/1996 | Hejlsberg | |
| 5,920,720 A | 7/1999 | Toutonghi | |
| 6,378,126 B2 * | 4/2002 | Tang | 717/143 |
| 6,412,105 B1 | 6/2002 | Maslennikov | |
| 6,442,558 B1 | 8/2002 | Brown | |
| 6,895,581 B1 | 5/2005 | Chkodrov | |
| 7,086,039 B2 | 8/2006 | Lam | |
| 2003/0023950 A1 | 1/2003 | Ma | |
| 2005/0034109 A1 | 2/2005 | Hamilton | |
| 2005/0177581 A1 | 8/2005 | Sezgin | |

OTHER PUBLICATIONS

Helin, "Combining Deep and Shallow Embeddings", 2006, ScienceDirect, pp. 61-79.*
Azurat et al., "A Survey on Embedding Programming Logics in a Theorem Prover", 2002, CiteSeerX, pp. 1-35.*
Britannica Online Encyclopedia, "Computer programming language", retrieved on May 8, 2010, http://www.britannica.com, 7pages.*
Liu et al., "Java Program Verification via a JVM Deep Embedding in ACL2", 2004, Springer-Verlag Berlin Heidelberg, pp. 184-200.*
Cristina Cifuentes, et al. Decompilation of Binary Programs. John Wiley & Sons, Ltd., Jan. 1995. http://www.cs.ubc.ca/rr/proceedings/spe91-95/spe/vol25/issue7/spe966cc.pdf, pp. 811-829.
John Reppy. Optimizing Nested Loops Using Local CPS Conversion. 2002 Kluwer Academic Publishers. Printed in the Netherlands. http://moby.cs.uchicago.edu/papers/2002/hosc-final.pdf, pp. 1-23.
Thorsten Brunklaus. A Virtual Machine for MultiLanguage Execution, 2002, http://www.ps.uni-sb.de/Papers/abstracts/multivm.pdf., 10 pages.

* cited by examiner

*Primary Examiner* — Ted T Vo

(57) ABSTRACT

A programming language is implemented in terms of another programming language via deep and/or modified shallow embedding. Embedded language control structures and/or type system are decomposed to primitive features. These features are semantically mapped to host language features. Other embedded language features are explicitly constructed in the host language. A map can also be constructed as a function of implementation to facilitate mapping embedded language applications to host language applications.

20 Claims, 13 Drawing Sheets

DEEP EMBEDDING OF PROGRAM LANGUAGES

BACKGROUND

Computer programs describe actions to be performed by a computer or processor-based device. When a computer program is loaded and executed on computer hardware, the computer will behave in a predetermined manner by following the instructions of the computer program. Accordingly, the computer becomes a specialized machine that performs the tasks prescribed by the instructions. A programmer using a programming language creates the instructions comprising a computer program. Initial programming languages were low-level machine code languages easily understood by computers. While these still exist, over time higher-level programming languages evolved that are more readily comprehensible to humans thereby enabling faster and easier specification of complex programs.

There are a number of disparate types of computer programming languages are in use today. In general, programs can be defined as imperative, declarative or functional. Imperative or procedural languages require a programmer to specify an algorithm to be executed. Declarative languages specify a goal and leave the underlying implementation to support software. Functional program languages are altogether different from both imperative and declarative languages as they are based a lambda calculus and focused on evaluation of mathematical functions.

Still further yet, there can be various categories or classifications within language types. For example, C is often described as a procedural programming language, because it is based upon the concept of modularity and scope of program code. C# and Java are object-oriented programming languages tuned to the creation and manipulation of program code as object classes. Furthermore, JavaScript is a scripting language based on prototype programming model, which is a class-less style of object-oriented programming. As a consequence of this specialization, programming languages have particular strengths and weaknesses.

Languages are selected for use as a function of their strengths and weaknesses as well as a particular problem space and/or environment. However, this is a difficult task, as it is unlikely that a single language will be the best for both a problem and environment. In most instances, a cost benefit analysis is undertaken to identify the best available language. Alternatively, if the problem space and/or environment are sufficiently unique as well as popular, a new programming language may be created to address this context.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to program language integration. More specifically, mechanisms are provided to facilitate implementation of at least a first programming language in terms of a second programming language. Rather than utilizing shallow embedding whereby high-level language constructs of an embedded language are mapped one-to-one to syntactically similar host language constructs, a deep embedding technique and/or a modified shallow embedding technique are employed. These techniques are directed more toward faithfully representing embedded language semantics than superficial language similarities.

In accordance with one aspect of the disclosure, an integration system is provided that employs deep embedding to integrate at least a first programming language within at least a second programming language. Deep embedding involves decomposing a language into semantic components and explicitly implementing or simulating those components in a host computer language to ensure semantic consistency. Additionally or alternatively, a modified shallow mapping can be employed in certain instances to directly map lower level semantic components to the same or similar components in the host language.

According to another aspect of the disclosure, a map can be generated as a function of language integration techniques. The map can then be utilized to translate or transform embedded language applications to those of a host language. For example, a virtual machine language application can be transformed into a JavaScript application, where the virtual machine language is embedded within or implemented in terms of the JavaScript language.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods are provided for integrating or embedding programming languages. A deep embedding technique is disclosed for program integration. More specifically, control structures and a type system of a language can be explicitly represented and/or simulated in a host language.

Such a technique is operable to minimize impedance mismatch or semantic inconsistency with respect to embedded and host languages. However, modified shallow embedding can be performed in certain instances for example where no semantic inconsistency exists and/or the inconsistency is acceptable given the cost of explicit implementation, among other things. Mechanisms are also provided to facilitate transforming program applications specified in the embedded language to the host programming language.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
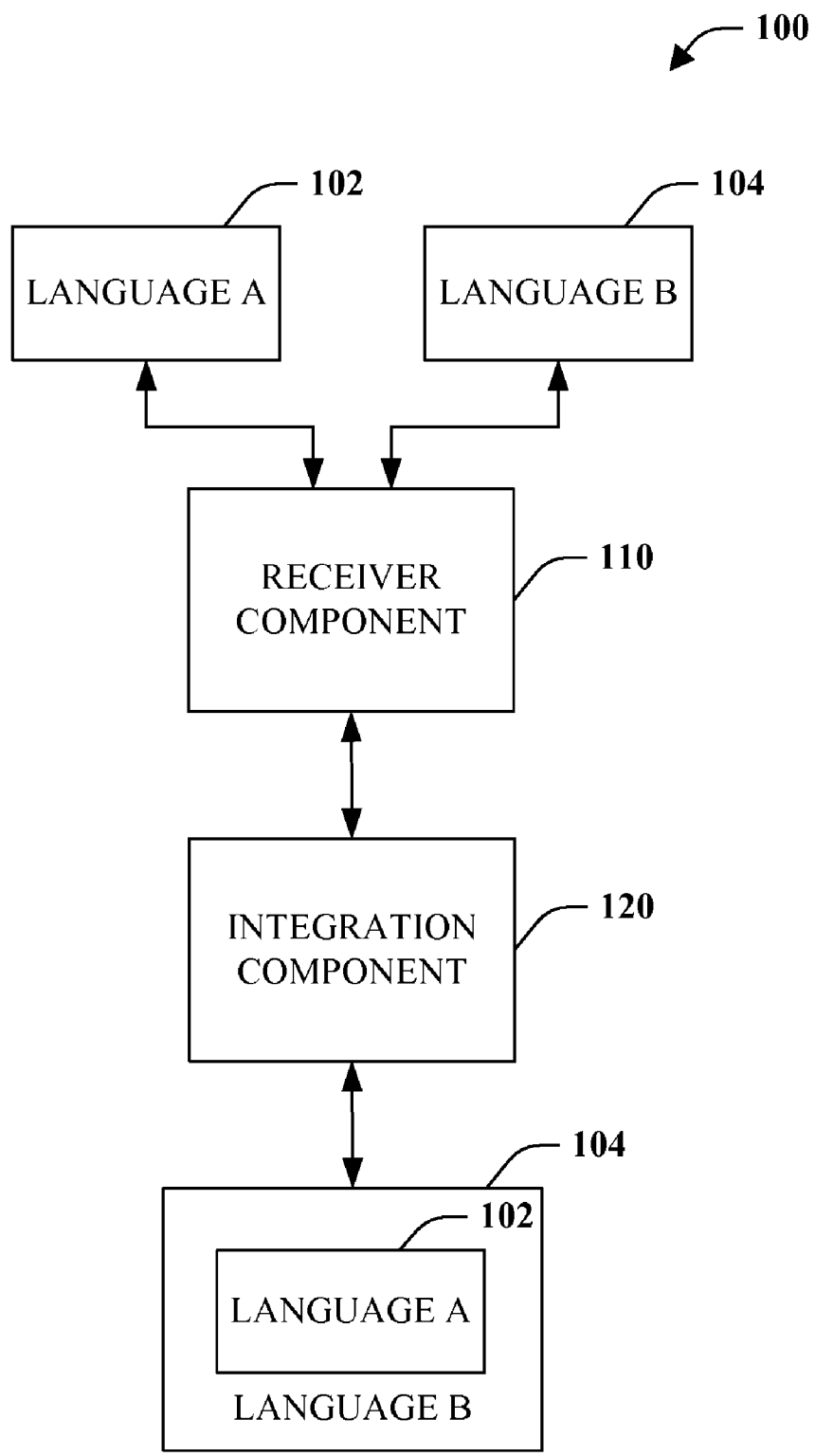
FIG. 1 is a block diagram of a language integration system.

Referring initially to FIG. 1, a language integration system 100 is illustrated in accordance with an aspect of this disclosure. Receiver component 110 receives, retrieves or otherwise acquires a plurality of programming languages or specifications thereof. Here, the receiver component 110 receives computer language "A" 102 and computer language "B" 104. These languages or specifications can be transmitted or otherwise made available to communicatively coupled integration component 120.

The integration component 120 provides a mechanism to integrate or embed at least one programming language within another. Upon acquisition of computer languages 102 and 104 from the receiver component 110, the integration component 120 can proceed to analyze the languages 102 and 104 and subsequently or concurrently integrate language 102 within language 104. It is to be noted that the language to be embedded and the host language will likely vary both syntactically as well as semantically. More specifically, each language has its own control structures and type system. The integration component 120 employs a deep embedding technique to ensure consistent semantics of the embedded language. In particular, the control structures and type system of the embedded language can be explicitly implemented or simulated in the host language. In other words, the embedded language can be implemented in terms of the host language. While the syntax may be different, this guarantees that the semantics are faithfully represented.

By contrast, consider a shallow embedding technique. Shallow embedding maps control structures and type systems of an embedded language directly to a host language. It is a one-to-one mapping. One of the reasons this is done is to make the host language resemble the syntax of the embedded language. Another reason is that it is easier. The pitfall is that there is an impedance mismatch or semantic inconsistencies. The embedded language ends up inheriting the semantics of the host language since the control structures and type system of the embedded and host language do not match. Thus, programmers then end up struggling with subtle differences seemly forever. For example, a control structure such as a while loop in an embedded language will be matched with a while loop in the host language. However, one may test a loop condition at the beginning while another may test at the end. While they look the same, they will occasionally generate different results unlike with deep embedding which may look different but generate expected results.

Figure 2:
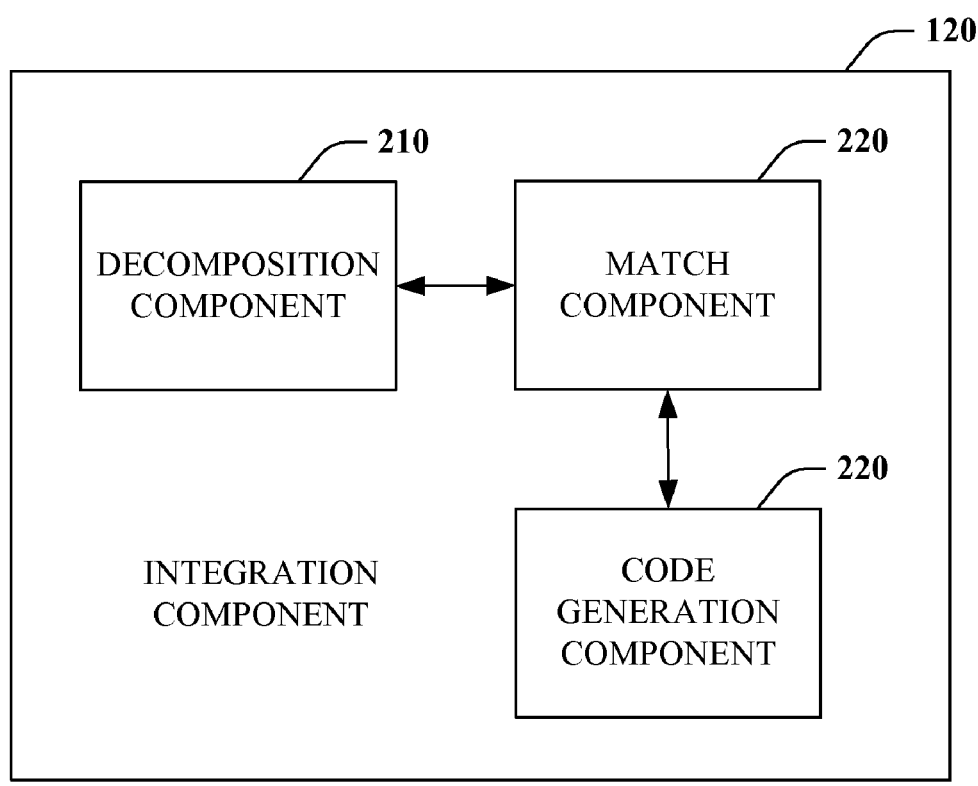
FIG. 2 is a block diagram of a representative integration component.

FIG. 2 depicts a representative integration component 120 according to an aspect of this disclosure. As previously described, the integration component is operable to employ deep embedding to integrate a language within another language. The integration component 120 includes a decomposition component 210 that provides a mechanism for breaking a language down into primitive semantic components or features. More specifically, the decomposition component 210 can produce a universal representation including semantic components that are independent of any potential host language and if explicitly implemented or natively supported by a host language the complete functionality of the language is available.

The decomposition component 210 is coupled to match component 220, which matches and/or maps embedded language semantic components to host language components. The match component 220 can match semantically identical or similar components. Where semantically equivalent components are matched and/or mapped there is a guarantee of semantic consistency. As will be discussed further infra, components that are not exactly the same can be mapped based on a type of cost-benefit analysis. In this case, there will be some semantic inconsistency but because they related to smaller primitive components the number and type of difference is small and controllable. For example, if integers in an embedded language are mapped to integers in a host language and there are differences, such differences would be much smaller than a mapping to something more general like numbers. This can also be considered modified shallow embedding of primitive semantic components.

The integration component 120 also includes a code generation component 230 coupled with the match component 220. Semantic components that are not matched and/or mapped can be provided to or identified by the code generation component 230, which can generate, subsequently or concurrently, explicit implementations or simulations of such components in a host language. Additionally, larger or higher-level semantic components can be implemented in a nested or recursive fashion as a function of lower-level components. In sum, the language integration component 120 can perform deep embedding with optional modified shallow embedding for matching semantic primitive components.

Figure 3:
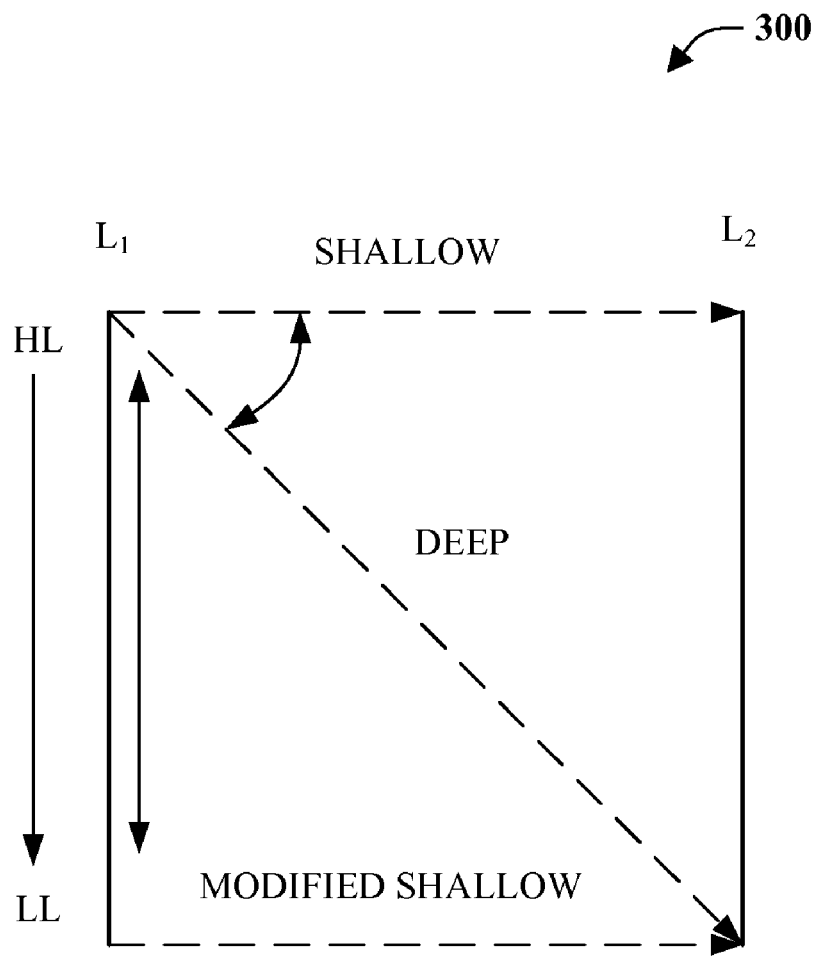
FIG. 3 is a graphical illustration of different mapping techniques.

Referring briefly to FIG. 3, a graphic illustration 300 of the differences between mapping techniques is illustrated to facilitate clarity and understanding. There are two programming languages "$L_1$" and "$L_2$," where "$L_1$" is to be embedded or integrated into "$L_2$." "HH" stands for high-level and "LL" stands for low level. Such measures can be relative. By way of example, integers can be considered lower level than numbers as they are a subset thereof, but higher-level than bits. Shallow embedding is shown as a horizontal line from the embedded language "$L_1$" to the host language "$L_2$" at a high or highest level. This provides the most opportunity for large semantic inconsistencies as large or high-level embedded language semantics are being mapped wholesale to high-level host semantics. Deep embedding, however, breaks down higher level constructs into more primitive semantic constructs and provides and explicit representation or simulation of the construct in terms of lower level components, for example. Consistency can thus be guaranteed. Modified shallow embedding is represented as the horizontal line from low level to low level indicating that while embedded language semantic components are being mapped directly to corresponding host language components this is being done at a lower level thereby making any potential impedance mismatches much smaller and manageable. In other words, modified shallow embedding is a combination of deep and shallow embedding, borrowing breaking down semantic components into smaller pieces from deep embedding and direct mapping from shallow embedding. As will be appreciated, these lines are extremes and implementations can lie somewhere in between. For example, a horizontal line can reside in the middle of the current shallow and modified shallow lines, which represents a modified shallow implementation operable on intermediate level semantic components.

Figure 4:
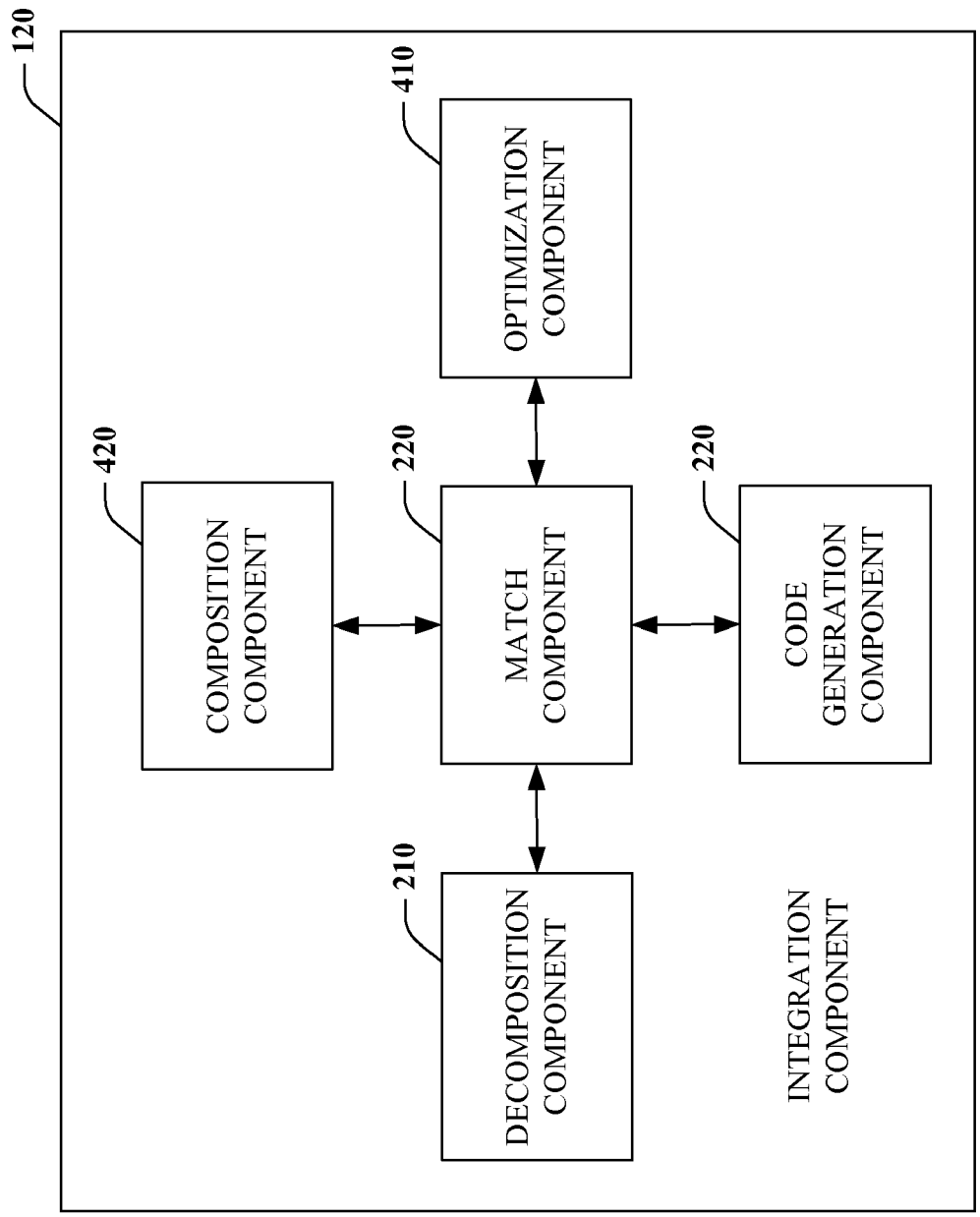
FIG. 4 is a block diagram of a representative integration component.

FIG. 4 illustrates another representative integration component 120 in accordance with an aspect one embodiment. Similar to FIG. 2, integration component 120 can include the decomposition component 210, match component 220 and code generation component 230, as previously described. In short, the decomposition component 210 identifies primitive semantic constructs associated with a programming language (e.g., at various levels), the match component 220 attempts to match and/or map the same or similar components across embedded and host languages and the code generation component generates explicit representations or simulations of non-matching components in the host language.

Further provided by the integration component 120 is optimization component 410, communicatively coupled to the match component 220. The optimization component 410 can evaluate potential matches to determine whether or not a match should occur based on semantic similarity, potential inconsistencies, and/or execution speed, amongst other metrics. While larger programmatic structures are being segmented into smaller semantic constructs, it should be appreciated that it may be prohibitively expensive in terms or performance to simulate everything. In some instances, it will be beneficial to generate explicit representations but in others direct mapping may be more appropriate. Accordingly, the optimization component 410 can interact with the match component 220 to determine, among other things, if and when semantically different components should be matched and/or mapped.

Consider floating point numbers, for example. It is often the case that an embedded language and a host language will implement different rounding behavior (e.g., 60 bits versus 80 bits). Hence, semantic differences exist, but they are small. The optimization component 410 could identify this and determine and/or infer that these non-identical semantic components should be matched because the cost of simulation outweighs the benefit of an exact semantic match.

In another instance, a host language could implement a one-pass exception-handling model, while the embedded language implements a two-pass model. Here, the optimization component 420 may suggest a direct mapping across these different components because although results might be inconsistent, the implementation and performance cost are large.

The integration component 120 can also include a composition component 420 communicatively coupled to the match component 120. The composition component 420 provides a mechanism to group smaller semantic components into larger components to facilitate semantic matching between embedded and host languages. While deconstruction component 210 is operable to break larger semantic components down to smaller components, it should be appreciated that matching might be available and beneficial at a higher level. Accordingly, the match component 120 and the composition component 420 can interact in an attempt to locate and map semantic components at a higher level. This can reduce the amount of explicit code required to be generated and potentially optimize performance, among other things.

Figure 5:
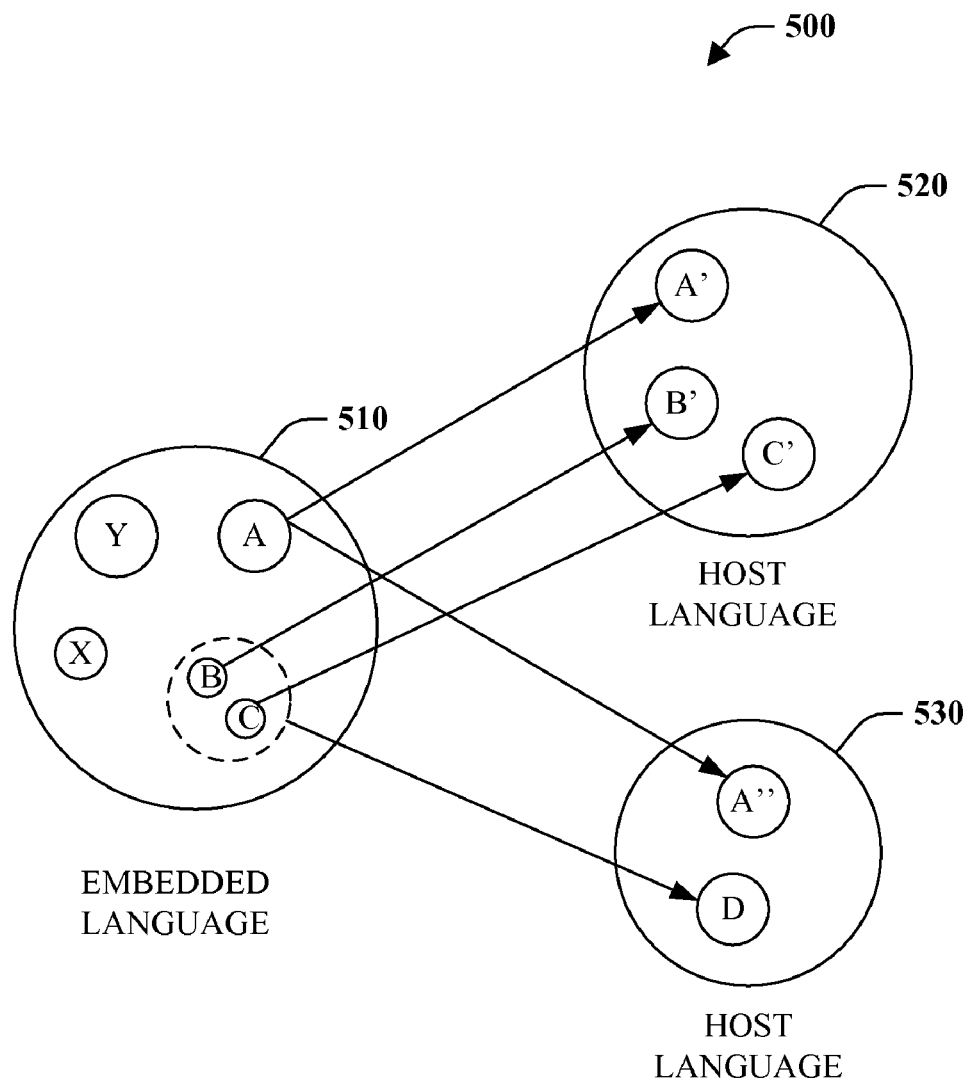
FIG. 5 is a graphical illustration of embedded and host language mappings.

Referring to FIG. 5, a graphical illustration of embedded and host language mapping is provided to facilitate clarity and understanding with respect to aspects of the innovation. As shown, there is a language 510 to be embedded within two host languages 520 and 530. The embedded language 510 is decomposed into primitive semantic components or a universal representation independent of host language syntax and/or semantics. These components are represented by a plurality of smaller circles within a large circle corresponding to the language 510. As indicated, three components can be mapped directly to semantic components host language 520. In particular, "A," "B" and "C" map directly to "A'," "B'" and "C'" either as identical or substantially similar semantic matches. Components "Y" and "Z" do not match any components of host language 520 and as a result will need to be explicitly implemented or simulated in host language 520.

As per the relationship between embedded language 510 and host language 530, it is first noted that semantic component "A" can be directly mapped to "A'." "B" and "C" do not map directly to any component of host language 530 directly. However, it can be observed that if grouped together they can map to semantic element "D." Again, "Y" and "Z" can be explicitly represented or simulated in the host language because they lack an appropriate mapping.

Figure 6:
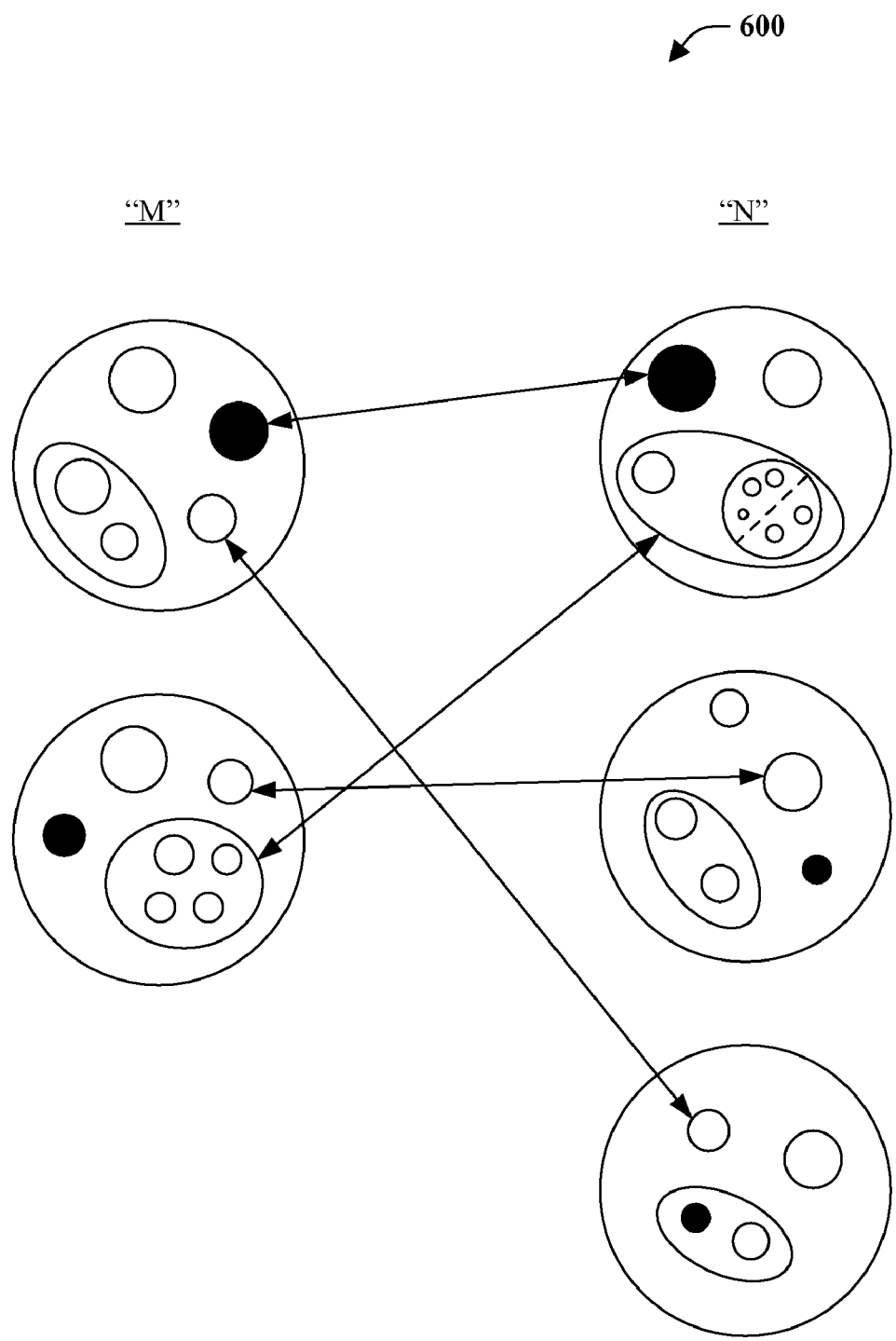
FIG. 6 is a graphical illustration of mappings amongst a plurality of languages.

As can be appreciated, any language can be embedded within one or more host languages. However, the scope of the subject innovation is not so limited. Referring briefly to FIG. 6, a graphical depiction 600 is provided illustrating mapping of "M" languages to "N" languages. Components of such languages can be mapped to and/or from one another. Further yet, various groups can be generated to enable direct mapping. It should be noted that while semantic components can be almost infinitely divided into smaller portions, an atomic level can be defined wherein an element cannot be divided any further, denoted as a solid circle in illustration 600. Otherwise, arbitrary groupings can formed of components to produce various semantic levels to facilitate matching and/or explicit implementation or simulation.

Further yet, a plurality of languages can be arbitrarily nested within one another providing interesting mappings and explicit language simulations. For example, if a first language is to be embedded within a host language but they are significantly different, a second language can employed to bridge the gap. In this instance, the first language can be embedded within the second language, which can then be embedded within a third host language.

Figure 7:
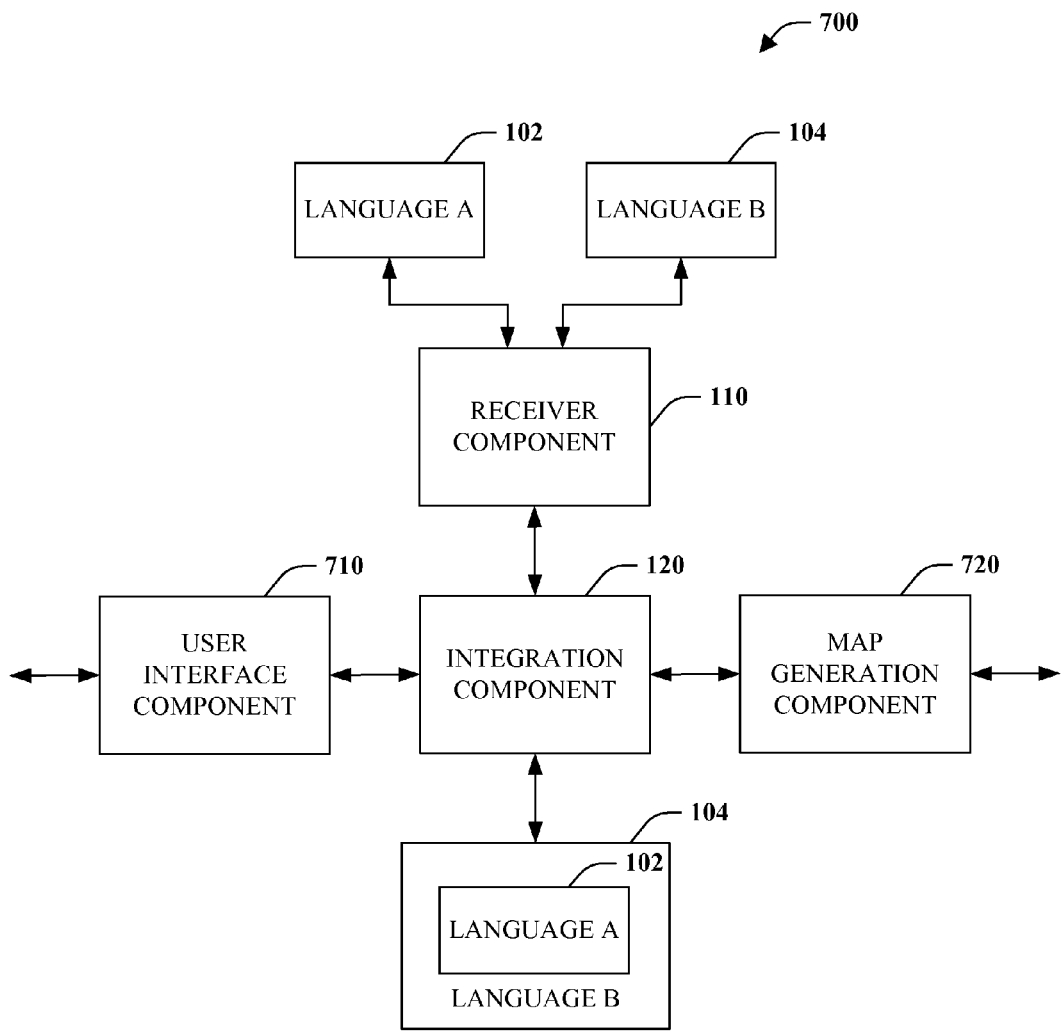
FIG. 7 is a block diagram of a language integration system.

Referring to FIG. 7, a language integration system 700 is illustrated. Similar to system 100 of FIG. 1, system 700 includes the receiver component 110 and the integration component 120. As previously, described, the receiver component can acquire a plurality of computer program languages or specifications thereof and the integration component can embed such components in a myriad of different manners.

Also included is user interface component 710 coupled to the integration component 710. While processes and/or functionality can be performed automatically via one or more components, users can also perform and/or control language integration. The user interface component 710 provides a mechanism to facilitate such interaction with system 700. By way of example, the integration component 120 can solicit user information regarding whether to map a component directly or provide an explicit implementation. Further yet, a user may provide the explicit implementation and/or provide or aid generation of a universal representation, inter alia.

Additionally, the system 700 includes a map generation component 720 communicatively coupled to the integration component 120. The map generation component 720 is a mechanism for generation of a map for use in language application translation. The integration component 120 integrates or imbeds at least one language within another host language. Applications or programs specified in the embedded language should be translated to the host language.

Figure 8:
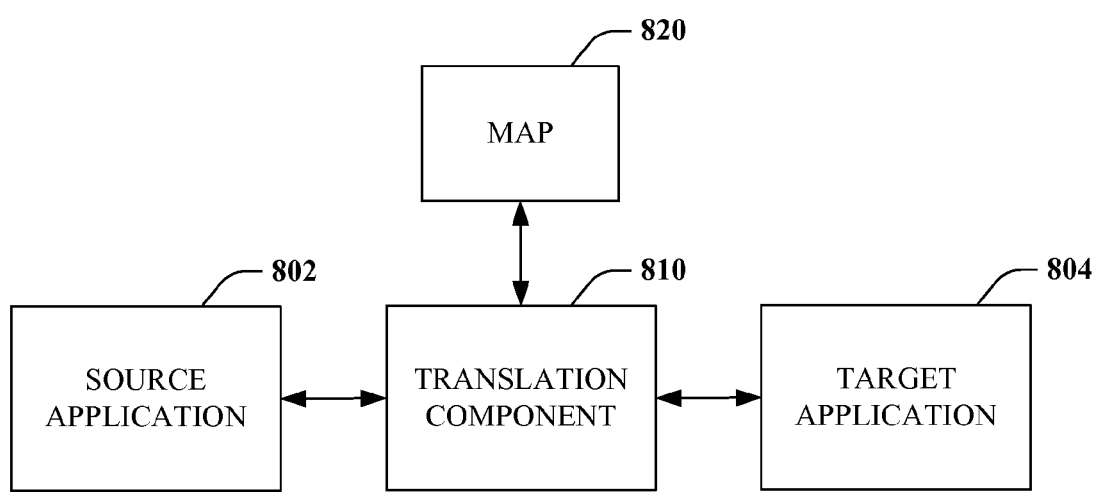
FIG. 8 is a block diagram of an application translation system.

FIG. 8 illustrates a language translation system 800 in accordance with an aspect of the subject innovation. The system 900 includes a translation component 910 operative to translate or convert an application specified in a first language to a second language. In particular, the translation component 910 can receive a source application 902 and a map, for example provided by the generation component 720 of FIG. 7. The map can specify translation information required to convert a source application to a target application. The translation component 710 can employ this information to convert the source application 902 to a target application 904. In one instance, the translation component 810 can be embodied or incorporated into a compiler, interpreter or the like.

In accordance with one exemplary embodiment of the innovation, programming languages can be embedded within a more internet or web browser friendly language such as JavaScript to enable code to be executed within a browser. In a specific embodiment, a virtual machine language (e.g., intermediate language, bytecode . . . ) can be embedded within a JavaScript or other like language. As a result, code in C#, Visual Basic (VB), C or other languages can be compiled to an intermediate language and subsequently compiled or interpreted into JavaScript, for instance. Stated differently, a virtual machine intermediate language application can be executable within a browser via transformation to a JavaScript application. Aspects of the subject disclosure can be employed to embed a virtual machine language within a browser-oriented language such as JavaScript. As such, a class-based language can embedded within a class-less language, for instance. Furthermore, the semantic mapping and/or implementation in the host language is innately and/or automatically obfuscated such that program logic will not be readily comprehensible by most users for example who choose to view the browser source code, thereby protecting potentially valuable intellectual property.

The aforementioned systems, architectures and the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the integration component 120 can utilize such mechanism to facilitate language integration selection of a best ratio of direct mapping and explicit implementation and/or simulation.

Figure 9:
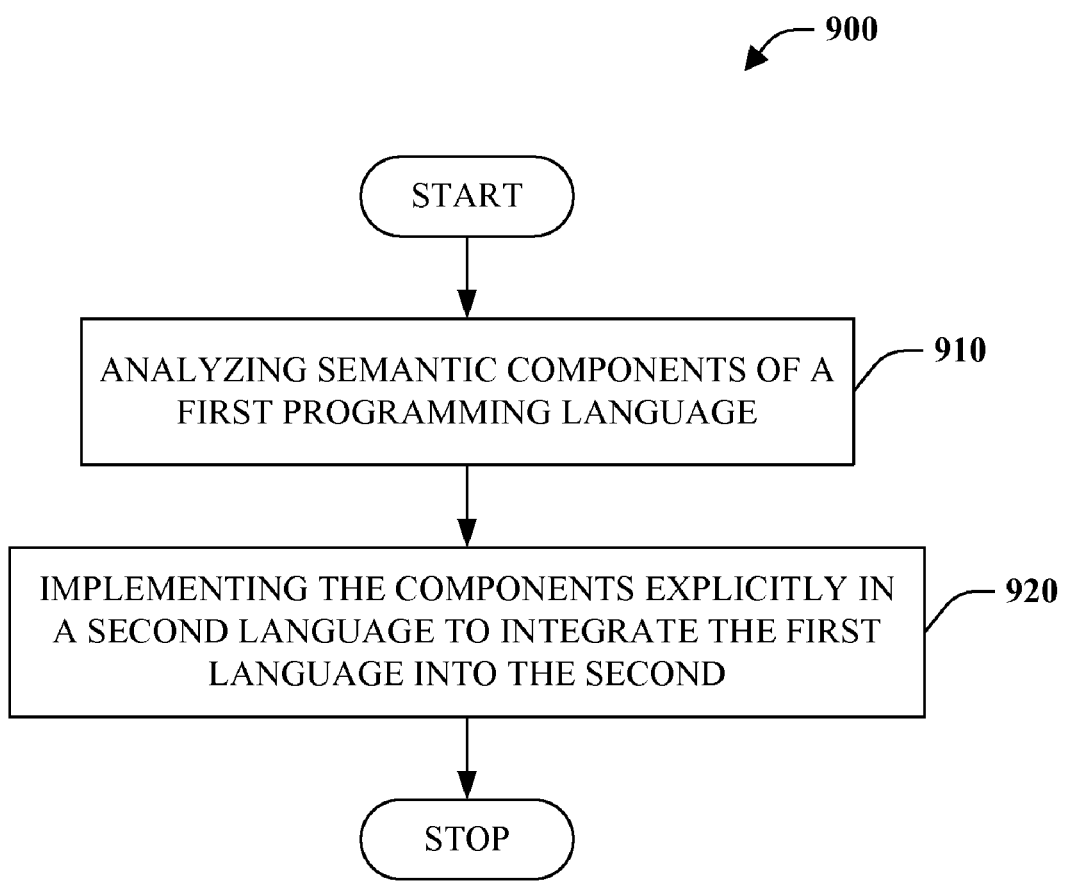
FIG. 9 is a flow chart diagram of a method of language integration.
Figure 10:
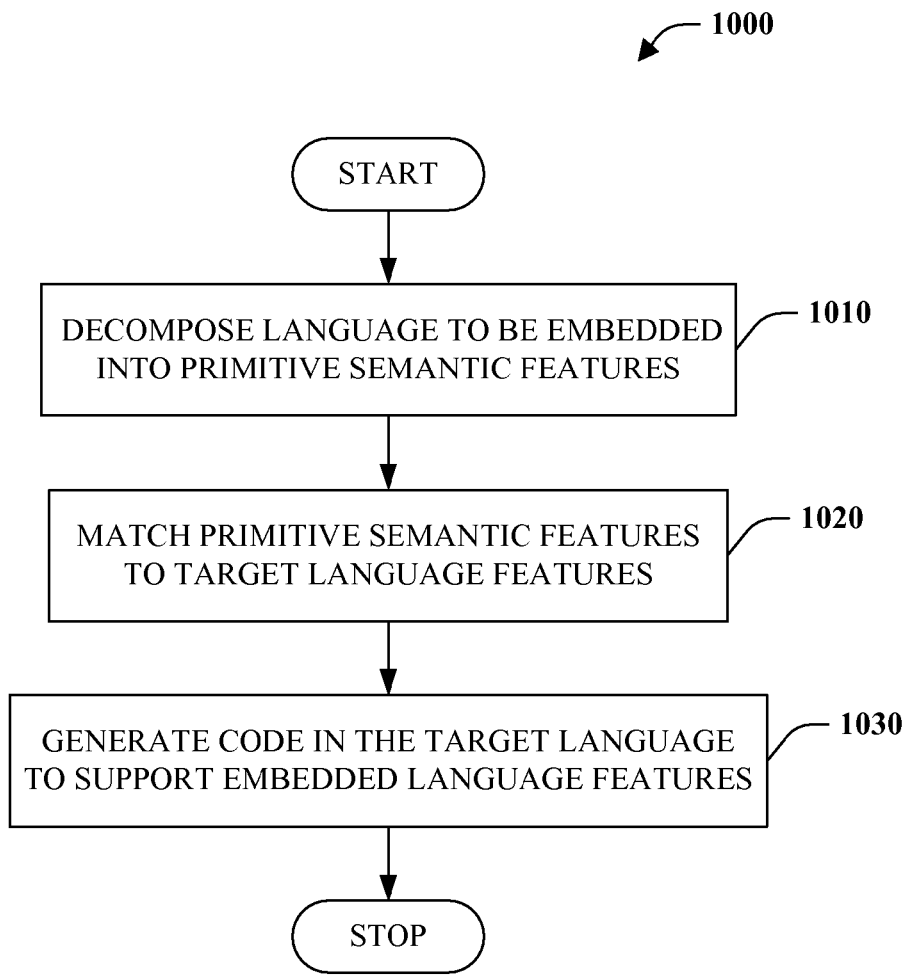
FIG. 10 is a flow chart diagram of a language integration method.
Figure 11:
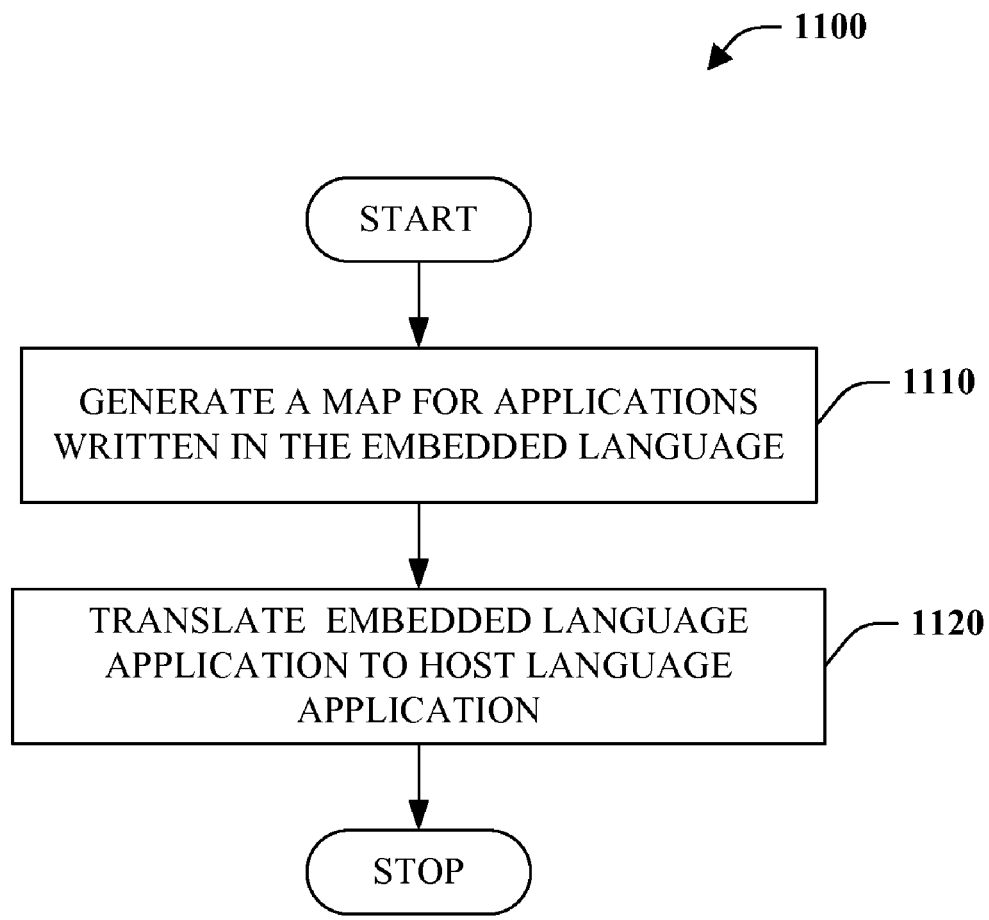
FIG. 11 is a flow chart diagram of a method of application translation associated with an embedded application.

In view of the exemplary systems described supra, methodologies that may be implemented in accordance with the disclosed subject matter will be better appreciated with reference to the flow charts of FIGS. 9-11. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Referring to FIG. 9, a method of language integration 900 is illustrated. In one instance, the method 900 can facilitate embedding a first language within a second language such as embedding a virtual machine language within a higher-level language (e.g., C, JavaScript). At reference numeral 910, a first language is analyzed to identify semantic components of the language such as language control structures and type system. These semantic components can then be explicitly implemented or simulated in a second language to affect incorporation of the first language within the second. In this manner, a language can be free of any semantic inconsistencies as the semantics are explicitly represented in the second or host language. In contrast, a simple shallow mapping of syntactically similar language features can result in inconsistent and/or unexpected results as the semantics are not well preserved.

Referring to FIG. 10, another language integration method 1000 is depicted. At reference numeral 1010, a language to be embedded or an embedded language can be decomposed into primitive semantic components corresponding to control structures and type system, among other things.

At numeral 1020, the language components are semantically matched and/or mapped to host language components. In one instance, such matching will only occur if mapping the components will not lead to semantic inconsistencies. Alternatively, the method 1000 can be more flexible and allow matching of components that may result in inconsistencies based on the type, kind and/or degree of inconsistency. The match can be scrutinized in light of context information such as likely applications, potential consequences, propagation and/or multiplication of inconsistencies, and/or performance requirements, among other things.

At reference numeral 1030, code is generated in a target host language to supported embedded language components or features. Stated differently, semantic components can be explicitly implemented and/or simulated in the host language. In one instance, such code generation can utilize direct code mappings to build higher level or more complex semantic components, for example in a nested or recursive fashion.

Turning attention to FIG. 11, a method of application translation is 1100 is depicted. At numeral 1110, a map is generated for applications in languages embedded or otherwise integrated into another programming language. Embedded languages can include explicit implementations and/or simulations of code in a host language and optionally some direct mappings of components. The generated map can map application language components to corresponding code in a host language based at least in part on the explicit implementations and/or direct mappings. At reference numeral 1120, the map can be employed to translate an application in an embedded language to an application in a host language. This translation process can correspond to or be incorporated with compilation and/or interpretation of embedded application code. For example, a virtual machine intermediate language application can be compiled to a JavaScript or C application, where the virtual machine language is embedded within either JavaScript or C.

As used herein, the terms "component," "system" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit the subject innovation or relevant portion thereof in any manner. It is to be appreciated that a myriad of additional or alternate examples could have been presented, but have been omitted for purposes of brevity.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 12:
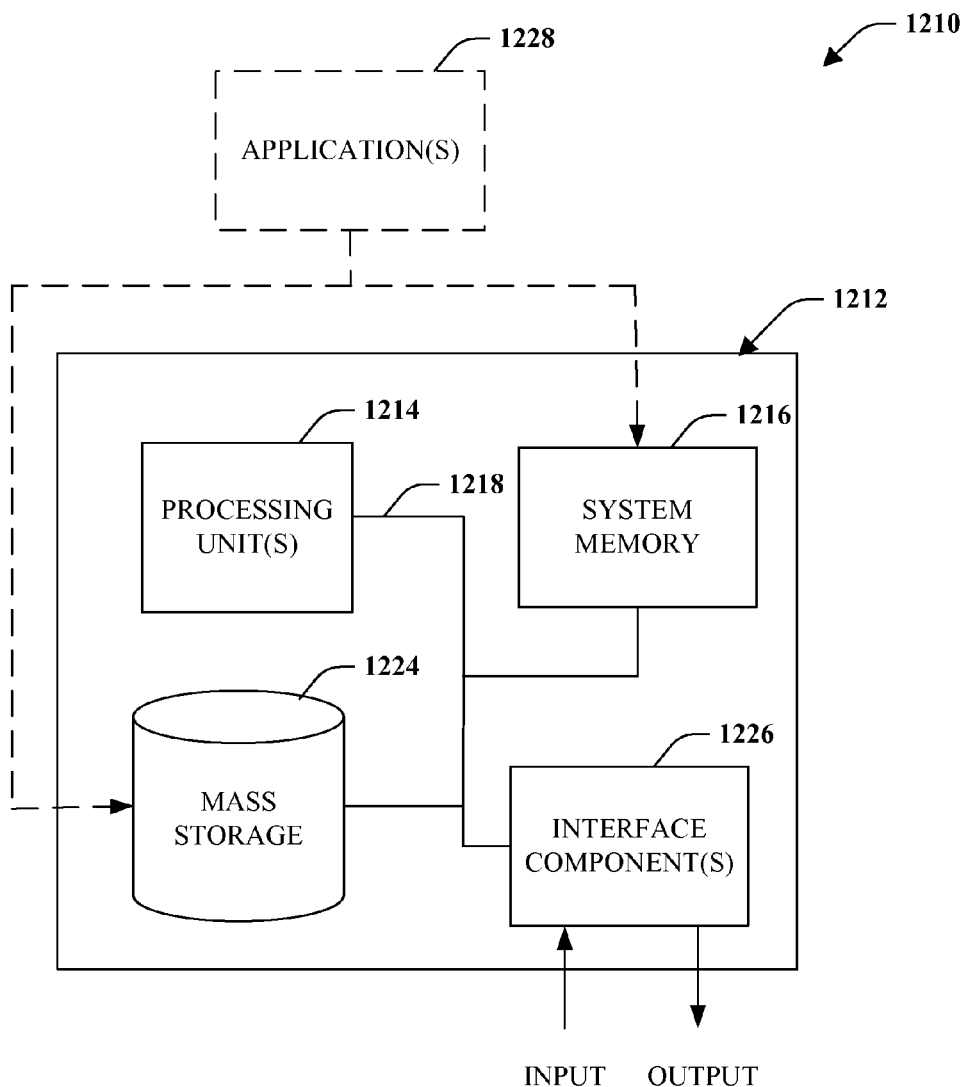
FIG. 12 is a schematic block diagram illustrating a suitable operating environment for aspects of the subject disclosure.
Figure 13:
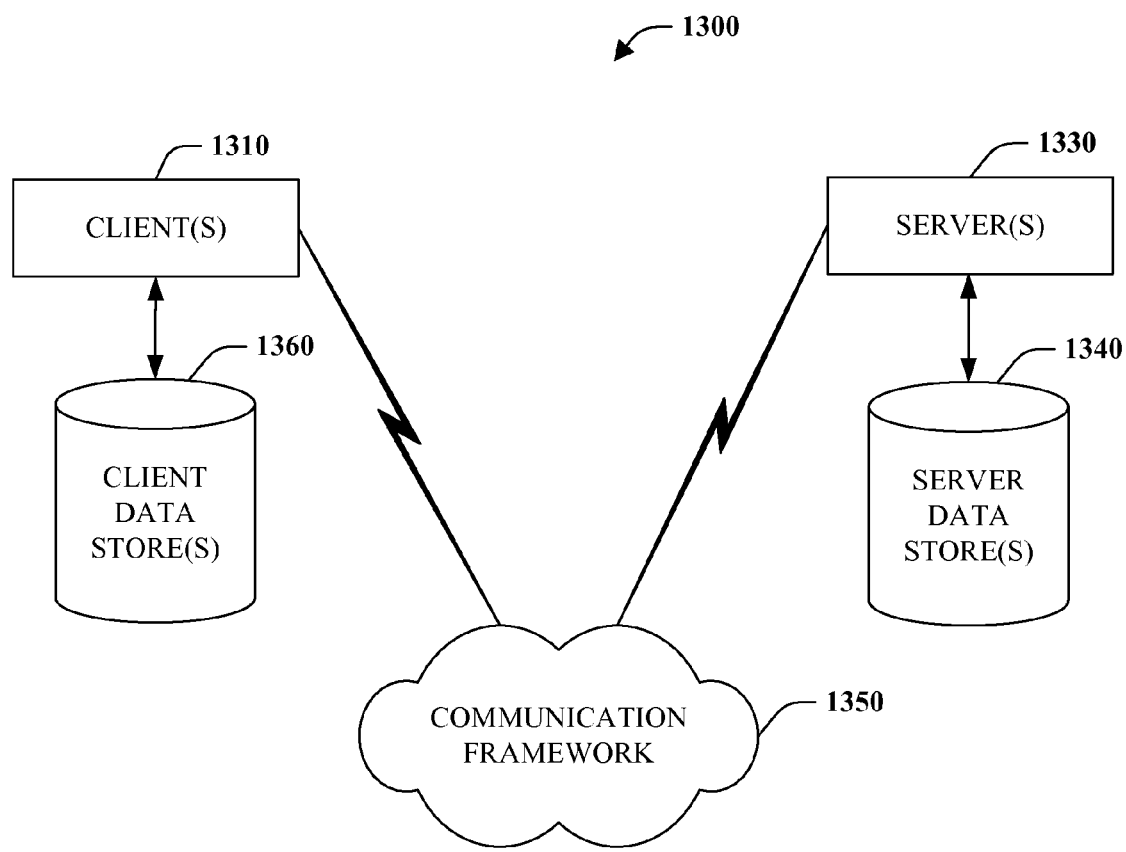
FIG. 13 is a schematic block diagram of a sample-computing environment.

In order to provide a context for the various aspects of the disclosed subject matter, FIGS. 12 and 13 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 12, an exemplary environment 1210 for implementing various aspects disclosed herein includes a computer 1212 (e.g., desktop, laptop, server, hand held, programmable consumer or industrial electronics . . . ). The computer 1212 includes a processing unit 1214, a system memory 1216 and a system bus 1218. The system bus 1218 couples system components including, but not limited to, the system memory 1216 to the processing unit 1214. The processing unit 1214 can be any of various available microprocessors. It is to be appreciated that dual microprocessors, multi-core and other multiprocessor architectures can be employed as the processing unit 1214.

The system memory 1216 includes volatile and nonvolatile memory. The basic input/output system (BIOS), containing the basic routines to transfer information between elements within the computer 1212, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1212 also includes removable/non-removable, volatile/non-volatile computer storage media. FIG. 12 illustrates, for example, mass storage 1224. Mass storage 1224 includes, but is not limited to, devices like a magnetic or optical disk drive, floppy disk drive, flash memory or memory stick. In addition, mass storage 1224 can include storage media separately or in combination with other storage media.

FIG. 12 provides software application(s) 1228 that act as an intermediary between users and/or other computers and the basic computer resources described in suitable operating environment 1210. Such software application(s) 1228 include one or both of system and application software. System software can include an operating system, which can be stored on mass storage 1224, that acts to control and allocate resources of the computer system 1212. Application software takes advantage of the management of resources by system software through program modules and data stored on either or both of system memory 1216 and mass storage 1224.

The computer 1212 also includes one or more interface components 1226 that are communicatively coupled to the bus 1218 and facilitate interaction with the computer 1212. By way of example, the interface component 1226 can be a port (e.g., serial, parallel, PCMCIA, USB, FireWire . . . ) or an interface card (e.g., sound, video, network . . . ) or the like. The interface component 1226 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1212 to output device(s) via interface component 1226. Output devices can include displays (e.g., CRT, LCD, plasma . . . ), speakers, printers and other computers, among other things.

FIG. 13 is a schematic block diagram of a sample-computing environment 1300 with which the subject innovation can interact. The system 1300 includes one or more client(s) 1310. The client(s) 1310 can be hardware and/or software (e.g., threads, processes, computing devices). The system 1300 also includes one or more server(s) 1330. Thus, system 1300 can correspond to a two-tier client server model or a multi-tier model (e.g., client, middle tier server, data server), amongst other models. The server(s) 1330 can also be hardware and/or software (e.g., threads, processes, computing devices). The servers 1330 can house threads to perform transformations by employing the aspects of the subject innovation, for example. One possible communication between a client 1310 and a server 1330 may be in the form of a data packet transmitted between two or more computer processes.

The system 1300 includes a communication framework 1350 that can be employed to facilitate communications between the client(s) 1310 and the server(s) 1330. Here, client(s) 1310 can refer to simplified query providers and the server(s) can provide the query processing mechanism. The client(s) 1310 are operatively connected to one or more client data store(s) 1360 that can be employed to store information local to the client(s) 1310. Similarly, the server(s) 1330 are operatively connected to one or more server data store(s) 1340 that can be employed to store information local to the servers 1330.

By way of example, a virtual machine language or intermediate language can be implemented in terms of a client-supported language. Applications can then be developed and/or generated and compiled to the virtual machine language on the server(s) 1330 and subsequently transmitted over the communication framework 1350 to the client(s) 1310. The client(s) 1310 can then compile or otherwise transform the application into the host language for execution by client(s) 1310. Alternatively, the server(s) 1330 can compile the application into a client supported language application and transmit that over the framework 1350 to the client(s) 1310 for execution.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A program language system, comprising:
    a memory having computer executable components stored thereon; and
    a processor communicatively coupled to the memory, the processor configured to execute the computer executable components, the computer executable components comprising:
        a receiver component configured to receive a first computer program language and a second computer program language; and
        an integration component configured to integrate the first computer program language into the second computer program language based on an output of a cost-benefit analysis weighing performance of a deep embedding operation and a modified shallow mapping operation, the integration component configured to employ, in response to the output of the cost-benefit analysis, the deep embedding operation that decomposes the first computer program language into semantic components and explicitly implements the semantic components in the second computer program language, or the modified shallow mapping operation that directly maps a set of the semantic components associated with the first computer program language to corresponding semantic components associated with the second computer program language at a same low level as the set, the same low level being lower than at least one higher level of the semantic components.

2. The system of claim 1, further comprising a component configured to decompose the first computer program language into primitive semantic features.

3. The system of claim 2, further comprising a match component configured to match one or more semantic features to native features of the second computer program language.

4. The system of claim 3, further comprising a composition component configured to group semantic features to aid the match component in matching native features.

5. The system of claim 3, further comprising a code generation component configured to facilitate implementation of non-matching features of the first computer program language in the second computer program language.

6. The system of claim 5, further comprising an optimization component configured to assist the match component in identification of matches as a function of execution speed versus potential semantic inconsistency.

7. The system of claim 1, further comprising a user interface component configured to enable a user to influence and/or control the integration component.

8. The system of claim 1, further comprising a component that generates a map between the first computer program language and the second computer program language based on embedded implementation to enable translation between applications in the first computer program language to applications in the second computer program language.

9. The system of claim 8, further comprising a component that translates an application specified in the first computer program language to an application in the second computer program language.

10. The system of claim 1, the first computer program language is associated with a virtual machine and the second computer program language is executable by a network browser.

11. The system of claim 1, the second computer program language is JavaScript.

12. A method of program language integration, comprising:
    employing a processor to execute computer executable instructions stored on a computer readable storage medium to implement the following acts:
        analyzing a first computer program language and a second computer program language;
        employing at least one of a deep embedding operation or a modified shallow mapping operation including comparing a first cost of employing the deep embedding operation and a second cost of employing the modified shallow mapping operation, wherein the deep embedding operation includes decomposing the first computer program language into semantic components and explicitly implementing the semantic components in the second computer program language, and wherein the modified shallow mapping operation includes directly mapping lower level semantic components associated with the first computer program language to corresponding lower level semantic components associated with the second computer program language; and integrating the first computer program language with the second computer program language according to at least one of the deep embedding operation or the shallow mapping operation.

13. The method of claim 12, further comprising deconstructing the first computer program language into primitive semantic components.

14. The method of claim 13, mapping at least one primitive component of the first computer program language to the same or/similar components in the second computer program language.

15. The method of claim 14, combining semantic components to facilitate a direct match between components of the first computer program language and the second computer program language.

16. The method of claim 14, further comprising analyzing execution and/or impedance factors of a particular mapping to determine whether to map similar components.

17. The method of claim 12, further comprising generating a map from the first computer program language to the second computer program language to facilitate translation of applications between the first computer program language and the second computer program language.

18. The method of claim 12, further comprising embedding a third language within the first computer program language.

19. A computer-readable storage medium, comprising:
computer-readable instructions, the computer-readable instructions including instructions for causing at least one processor to facilitate performing acts, comprising:
receiving a first computer program language and a second computer program language;
employing at least one of a deep embedding operation or a modified shallow mapping operation including analyzing and comparing a first cost and a first benefit of employing the deep embedding operation and a second cost and a second benefit of employing the modified shallow mapping operation, wherein the deep embedding operation includes decomposing the first computer program language into semantic components and explicitly implementing the semantic components in the second computer program language, and wherein the modified shallow mapping operation includes directly mapping lower level semantic components associated with the first computer program language to corresponding lower level semantic components associated with the second computer program language; and
generating code in the second computer program language according to at least one of the deep embedding operation or the shallow mapping operation, wherein a portion of the first computer program language is integrated into the second computer program language.

20. The computer-readable storage medium of claim 19, wherein the computer-readable instructions include instructions for causing at least one processor to match at least one component in the first computer program language to at least one component in the second computer program language.

* * * * *

UNITED STATES PATENT AND TRADEMARK OFFICE
CERTIFICATE OF CORRECTION

| | |
|---|---|
| PATENT NO. | : 8,091,070 B2 |
| APPLICATION NO. | : 11/621018 |
| DATED | : January 3, 2012 |
| INVENTOR(S) | : Henricus Johannes Maria Meijer et al. |

It is certified that error appears in the above-identified patent and that said Letters Patent is hereby corrected as shown below:

In column 12, line 34, in Claim 8, delete "thefirst" and insert -- the first --, therefor.

Signed and Sealed this
Twenty-eighth Day of February, 2012

David J. Kappos
*Director of the United States Patent and Trademark Office*